United States Patent Office 3,442,799
Patented May 6, 1969

3,442,799
CLARIFICATION OF RAW SEWAGE USING HYDROLYZED COPOLYMERS OF POLYMERIZABLE ACRYLIC AND VINYL COMPOUNDS
Frank J. Glavis, Rydal, David H. Clemens, Willow Grove, and Roger P. McDonnell, Philadelphia, Pa., assignors to Rohn & Haas Company, Philadelphia, Pa., a corporation of Delaware
No Drawing. Filed Aug. 4, 1966, Ser. No. 570,168
Int. Cl. C02b *1/20;* C08f *15/36*
U.S. Cl. 210—54       6 Claims

ABSTRACT OF THE DISCLOSURE

A polymeric flocculant capable of multifunctional aggregation containing (a) acrylate and/or methacrylate salt units and (b) vinyl hydroxide units is useful as a single clarification agent for separating suspended solids from raw sewage. The preferred flocculant is a sodium acrylate/vinyl alcohol copolymer prepared as the heterohydrolysis product of a methyl acrylate/vinyl acetate copolymer. The heterohydrolysis reaction is carried essentially to completion with sodium hydroxide in aqueous methanol. The molecular weight of the heterohydrolyzed flocculant is relatively low, i.e. an intrinsic viscosity of from about 1.0 to about 2.5.

---

This invention relates to the clarification of raw sewage. In particular, this invention relates to the clarification of raw sewage through the use of a flocculant composed of hydrolyzed copolymers of polymerizable acrylic and vinyl compounds. The primary advantage of this invention is its effective reduction of the solids load upon the secondary clarifiers of a conventional water waste treatment plant.

Sewage is the refuse liquid or waste matter carried off by sewers. It is a mixture of the wastes from household and industry that can be carried away by water. The term "sewage" refers to any aqueous liquor that contains significant amounts of wastes, such as fecal matter, domestic wastes and industrial wastes.

More particularly, sewage is a diverse multifunctional substrate that is a great deal more difficult to aggregate than a relatively uniform composition such as soil. This multifunctionality of sewage entails certain disadvantages in the use of monofunctional flocculants. There are substituents in the sewage that are aggregated by some monofunctional flocculants, but the sewage contains other functional group substituents that are not aggregable by treatment with a mere monofunctional flocculant, or a flocculant that is not capable of multifunctional aggregation. For example, a flocculant containing only—COOH units, or one containing only—OH units will not effectively aggregate raw sewage. This inability to aggregate raw sewage persists even when high molecular weight (4–6 million) monofunctional flocculants are used. The composition of sewage has been investigated and it is possible to identify the presence of various chemical groups such as fatty acids, such as palmitic, stearic and oleic; fatty esters; proteins; amino acids; carbohydrates such as glucose, sucrose, lactose, galactose, fructose, arabinose and xylose; fats; amides; anionic surface-active agents; creatinine; amino sugars; muramic acid and volatile acids such as formic, acetic, propionic, butryic and valeric; non-volatile soluble acids such as glutaric, glycolic, lactic, citric, benzoic and phenyl-lactic. There are many more compounds present in very low concentrations, and undoubtelly many more groups remain undetected. For a detailed discussion concerning the composition of sewage, see L. Walter, "Composition of Sewage and Sewage Effluents," Water and Sewage Works, November 1961, pages 428–431 and 478–481.

The prior art discloses a host of chemical treatments for sewage. For example, the following materials have been used: ferric chloride, ferric sulfate, ferrous sulfate, chlorinated copperas, calcium oxide, calcium hydroxide, aluminum sulfate, alkali hypochlorites, soda ash, activated silica, calcium carbonate, coal, diatomite, activated carbon, ammonium sulfate, sodium aluminate, sodium silicofluoride, sodium fluoride, caustic, sulfuric acid, activated glue, rosin size, pine oil, kerosene, copper sulfate, chloramine, sulfur dioxide, sodium sulfite, nitric acid, carbon dioxide, hydrochloric acid, oxygen, ozone, and chlorine. Also, iron and aluminum salts have been used as coagulants or flocculants for sewage, and they were effective to some degree in removing colloidal solids and very finely divided suspended matter. Both the iron and aluminum salts sometimes used (ferric chloride, alum, and the like) have the property of forming relatively insoluble flocs that enmesh suspended material in the sewage, some of which material is swept out of the sewage as the floc matrix is removed. Iron and aluminum salts have been used also in the coagulation of sewage sludge, particularly in the preparation of the sludge for dewatering.

Water-insoluble synthetic organic polyelectrolytes (ion exchange resins) have been used in the prior art in the conditioning of certain aqueous liquors. The performance of carboxylic exchange resins in the removal of material from certain types of aqueous liquors, for example, has been described by Kunin and Barry, in Industrial and Engineering Chemistry, 41, 1269–72 (1949); by Winters and Kunin, in Industrial and Engineering Chemistry, 41, 460 (1949); by McGarvey and Thompson, Industrial and Engineering Chemistry, 43, 741 (1951); and by others. Such water-insoluble ion exchangers have never found widespread commercial usage in the treatment of municipal sewage, by reason of their relative ineffectiveness especially in the light of their high initial and operating costs, and the general operational difficulties associated with the use of insoluble ion exchangers in aqueous liquors containing suspended solids.

United States Patent, 3,142,638 discloses a method for the treatment of sewage which involves the flocculation of sewage by the cooperative effect of a cationic organic polymer and a weighting agent. The metal material of the weighting agent is bonded to the organic polymer by means of partially covalent or coordinate covalent bonds. In particular, United States Patent 3,142,638 discloses the synergistic combination of a water-dispersible synthetic organic cationic polyelectrolyte and iron ore. The polyelectrolyte moiety of the flocculant contains primary amine, secondary amine, tertiary amine, quaternary amine groups, or combinations thereof. It also discloses that anionic flocculating material may be admixed with the synergistic combination of the cationic polyelectrolyte and the weighting agent.

Canadian Patent 607,440 discloses that the incorporation of a water-soluble acrylamide polymer in sewage facilitates the separation of suspended solids from the sewage by processes of sedimentation and filtration.

Republic of South Africa patent application 63/4367 discloses the use of a dispersant comprising copolymers of polymerizable acrylic and vinyl compounds in combination with a water softening agent, such as an alkali metal phosphate, to improve the flowability of mineral sludges (calcium and magnesium salts) which develop in boiler water and deposit as scale upon the inner surfaces of the boiler vessels.

It is an object of this invention to provide a method for facilitating the separation of suspended solids from sewage. It is a further object to provide a method to improve the rate of sedimentation and the filtration characteristics of sewage and sewage products. It is another object of this invention to provide a sewage clarification process which causes rapid flocculation and sedimentation of solids in order to reduce the solids load upon the secondary clarifiers of a conventional water waste treatment plant.

In accordance with this invention it has been discovered that raw sewage of the type defined supra is unexpectedly clarified to a high degree by the relatively low molecular weight multifunctional polymeric flocculant compositions of this invention. The flocculant compositions of this invention are hydrolyzed copolymers comprising acrylic units and vinyl units. The polymeric precursors of the hydrolyzed products of this invention are copolymers derived from the polymerization of an acrylic monomer component and a vinyl ester component.

Representative of the acrylic monomer component are the lower alkyl esters of acrylic and methacrylic acid such as methyl acrylate and methacrylate, ethyl acrylate and methacrylate, butyl acrylate and methacrylate, acrylamide, methacylamide, acrylonitrile, methacrylonitrile, alkali metal or ammonium salts of the acrylic or methacrylic compounds and mixtures thereof.

Representative of the vinyl ester component are the esters of lower alkanols ($C_1$–$C_4$), such as vinyl acetate, vinyl propionate, vinyl butyrate and other vinyl compounds capable of being hydrolyzed so that the hydroxyl functionality is included in the hydrolyzed product.

The preferred hydrolyzed products of this invention comprise the salts of acrylic compounds and vinyl alcohol.

The preferred hydrolyzed product of this invention is the copolymer of sodium acrylate (NaA)/vinyl alcohol (VOH) prepared as a product of the hydrolysis, in aqueous methanol with sodium hydroxide, of a copolymer of methyl acrylate (MA)/vinyl acetate (VA).

The preparation of the multifunctional polymeric flocculants of this invention can be represented by the following chemical reactions. For simplicity the reaction is shown for a 1:1 copolymer.

—$CH_2$—$CH(COOCH_3)$—$CH_2$—$CH(OOCCH_3)$—
$+2NaOH \rightarrow$
—$CH_2$—$CH(COONa)$—$CH_2$—$CH(OH)$—
$+CH_3OH+CH_3COONa$ From these reactions it can be seen that the initial monomers can be polymerized in various ratios and subsequently hydrolyzed essentially to completion with sodium hydroxide to produce the final product. The following references relate to the hydrolysis of similar polymers in a similar reaction medium: U.S. 2,897,172; U.S. 2,940,948; U.S. 3,161,621; U.S. 3,028,374; U.S. 2,676,938; Great Britain 848,348; Great Britain 863,228; and Canadian 615,527. It is believed that a factor contributing to the ability of the multifunctional polymers of this invention to clarify raw sewage is the distribution of hydroxyl functionalities in the resultant copolymer.

The molecular weights of the hydrolyzed products of this invention are surprisingly low when compared with the materials used heretofore for sewage flocculants. The molecular weight range for the polymeric precursors may be defined in terms of the intrinsic viscosity in acetone at 30° C. The molecular weight is determined from known $k$ and alpha values in the Mark-Houwink formula, wherein the intrinsic viscosity is equal to $k \times M\alpha$. The values of $k$ and alpha are constant; therefore, when the intrinsic viscosity is measured, the molecular weight may be calculated. The MA/VA precursor is in the molecular weight range of from about an intrinsic viscosity of 1.0 and above. The preferred molecular weight range is from about an intrinsic viscosity of 1.5 to 2.5. It has been found that there is no polymer molecular weight degradation during the hydrolysis step. For example, the intrinsic viscosity in acetone at 30° C. of the precursor polymer, MA/VA, is 2.14, while the intrinsic viscosity in 2 N sodium nitrate at 25° C. of the hydrolyzed product, NaA/VOH, is 2.32 (the polyelectrolyte nature of the hydrolysis product necessitated a change in solvent).

The preferred flocculants of this invention are the heterohydrolyzed alkyl acrylate or methacrylate-vinyl acetate copolymers such as heterohydrolyzed methyl acrylate-vinyl acetate copolymers. The term "heterohydrolyzed" is used herein to refer to a condition wherein the hydrolyzed copolymer will not dissolve or be appreciably swollen in the hydrolysis medium such as an alcohol-water mixture, although the pre-hydrolyzed polymer, insoluble under heterohydrolysis conditions, is swelled by the medium. The hydrolysis medium results from the addition of an alcohol and sodium hydroxide for hydrolysis purposes to the latex resulting from the emulsion copolymerization of the polymerizable acrylic and vinyl compounds.

The following tables qualitatively illustrate the effect of varying the monomer ratio in the copolymer precursor of the preferred hydrolyzed products by measuring the coagulation activity of hydrolyzed copolymer samples having varying monomer ratios. The coagulation activity rating is based on the quantity of the floc accumulated after a flocculation period of about 30 minutes following the addition of about 0.25 p.p.m. of the copolymer to a 2-liter sample of raw sewage; it is a measure of floc size and setting capability based on visual observations. The value of 1 is assigned to the sewage sample exhibiting the greatest degree of floc size and settling within the time of the test period.

TABLE I

| Sample No. | Precursor polymer | | Coagulation activity rating |
|---|---|---|---|
| | Composition | Intrinsic viscosity | |
| 1 | MA(100%) | 1.56 | 6 |
| 2 | MA(100%) | 2.45 | 4 |
| 3 | MA(90%)/VA(10%) | 3.06 | 6 |
| 4 | MA(66%)/VA(34%) | | 1 |
| 5 | MA(50%)/VA(50%) | 2.54 | 2 |

TABLE II

| Sample No. | Precursor polymer | | Coagulation activity rating |
|---|---|---|---|
| | Composition | Intrinsic viscosity | |
| 1 | MA(80%)/VA(20%) | 2.76 | 1 |
| 2 | MA(80%)/VA(20%) | 1.84 | 3 |
| 3 | MA(66%)/VA(34%) | | 3 |
| 4 | MA(66%)/VA(34%) | | 2 |
| 5 | MA(66%)/VA(34%) | 2.10 | 1 |
| 6 | MA(60%)/VA(40%) | 2.18 | 3 |

Based on the coagulation activity ratings (a measure of settling capability), it is evident that the copolymers of this invention exhibit outstanding coagulation properties (solids removal capability) for raw sewage in the monomer ratio range of MA/VA from about 80–50 MA to about 20–50 VA on a molar basis; this can also be expressed as copolymers of MA/VA in the weight proportions of from about 80:20 to about 50:50.

The following Tables III and IV, representing two series of tests, quantitatively compare the coagulation properties of the preferred heterohydrolyzed copolymers of this invention with the coagulation properties of a prior art sewage flocculant. The latter is the sodium salt of polyvinyltoluene sulfonic acid (PVTS). A uniform dosage of flocculant, in the order of about 0.25 p.p.m., was used in both series.

TABLE III

| Sample No. | Precursor polymer | | Coagulation activity rating | Percent suspended solids removed |
|---|---|---|---|---|
| | Composition | Intrinsic viscosity | | |
| 1 | Raw sewage (settled) | | 5 | 5.3 |
| 2 | PVTS | | 3 | 33.0 |
| 3 | MA(80%)/VA(20%) | 2.76 | 1 | 75.0 |
| 4 | MA(66%)/VA(34%) | | 2 | 68.0 |
| 5 | MA(50%)/VA(50%) | 2.54 | 3 | 69.0 |

TABLE IV

| Sample No. | Precursor polymer | | Coagulation activity rating | Percent suspended solids removed |
|---|---|---|---|---|
| | Composition | Intrinsic viscosity | | |
| 1 | Raw sewage (settled) | | 6 | 7.5 |
| 2 | PVTS | | 4 | 26.8 |
| 3 | MA(80%)/VA(20%) | 1.84 | 3 | 44.1 |
| 4 | MA(66%)/VA(34%) | | 2 | 73.2 |
| 5 | MA(66%)/VA(34%) | 2.10 | 1 | 58.0 |
| 6 | MA(60%)/VA(40%) | 2.18 | 2 | 80.0 |

The multifunctional hydroxy-carboxylic compoistions of this invention have been compared to their monofunctional components in their ability to clarify raw sewage. For example, high molecular weight hydrolyzed methyl acrylates (substantially converted to sodium polyacrylate) having intrinsic viscosities of about 1.56 and about 2.45 were tested for raw sewage coagulation activity. In addition, high molecular weight sodium polyacrylates and methacrylates were synthesized directly from their monomers and tested for raw sewage coagulation activity. A commercially available polyvinyl alcohol, "Elvanol," having a molecular weight of about 100,000 was also tested for raw sewage coagulation activity. It was discovered that none of the above monofunctional polymers performed as well as the multifunctional polymers of this invention, especially the multifunctional polymers having a weight or molar monomer ratio of 66 MA/34 VA before hydrolysis and a polymer component molar ratio of 81 NaA/19 VOH after hydrolysis. An increase in molecular weight of a monofunctional polymer, such as 100% sodium polyacrylate, by a factor of 5 still does not achieve the level of coagulation activity displayed by the multifunctional polymers of this invention. It was also discoverd that a 90 MA/10 VA copolymer which is heterohydrolyzed to a 95 NaA/5 VOH copolymer is not effective in the clarification of raw sewage (see tables supra), while excellent raw sewage clarification is achieved through the use of copolymers in the range of from about 50 MA/50 VA (heterohydrolyzed to 68 NaA/32 VOH) to about 80 MA/20 VA (hydrolyzed to 91 NaA/9 VOH) (see tables supra). From this selective acitvity it can be seen that a certain substantivity is related to the inclusion in the polymer of not less than about 10% by weight of the polymer of vinyl alcohol in achieving good coagulation performance in the flocculation of raw sewage.

To assist those skilled in the art to practice the present invention, the following modes of operation are suggested by way of illustration, parts and percentages being by weight and the temperatures in degrees C. unless otherwise specifically noted.

PREPARATION OF FLOCCULANT

A. Preparation of precursor polymer

A mixture of methyl acrylate (MA) and vinyl acetate (VA) is prepared in the weight proportions of 66 parts by weight of MA to 34 parts by weight of VA. A 0.024% solution, based on the weight of the monomers, of sodium metabisulfite in water is prepared. Diisobutyl phenyl polyethoxy ethanol (having 39 ethylene oxide units) 5.0% by weight, based on the weight of the monomers, water in the amount of 76% by weight of the monomers, and 10% by weight of the monomer mixture are charged to a stirred polymerization vessel fitted with a reflux condenser and a temperature recording device. The reaction mixture is deoxygenated with nitrogen and the batch temperature is adjusted to 40° C. To the adjusted vessel charge is then added 0.02% (based on total monomer weight) of t-butyl hydroperoxide (TBHP) and one-tenth of the sodium metabisulfite feed. Within a few minutes, an exotherm raises the batch temperature to 60° C. and the simultaneous and proportionate addition of the remainder of the two feed streams (monomer mix and sodium metabisulfide solution) is carried out at such a rate that the addition requires about three hours. A modest exotherm results and completion of the polymerization is obtained. The latex is stable and has a Brookfield viscosity of 125 centipoises, determined with spindle 4 at 60 r.p.m.

Hydrolysis of the precursor polymer 100 parts by weight of the polymer latex is added slowly and uniformly to an equal amount of methanol, with effective agitation and with the batch temperature maintained at 20° C. In this way, a finely-divided suspended material is obtained. In order to stabilize the latex to permit pumping, a stabilizing amount of an anionic emulsifier is added.

32 parts by weight of sodium hydroxide is partially dissolved and partially suspended in 32 parts by weight of methanol, and the suspended latex is added slowly and uniformly over a period of 1–2 hours with the batch temperature carefully held at 45° C. When the mixing has been completed at 45° C., the batch is heated to about 70° C. for three hours to assure complete hydrolysis of the polymer.

The suspended hydrolized polymer is isolated by means of a basket centrifuge.

B. The hydrolized polymer is prepared in the same way as procedure (A); however, potassium hydroxide is used in the hydrolysis step in place of sodium hydroxide.

C. The hydrolized polymer is prepared in the same way as procedure (A); however, calcium hydroxide is used in the hydrolysis step in place of sodium hydroxide.

D. The hydrolyzed polymer is prepared in the same way as procedure (A); however, a mixture of 85 percent by weight of sodium hydroxide and 15 percent by weight of calcium hydroxide is used in place of sodium hydroxide.

E. The hydrolized polymer is prepared in the same way as procedure (A); however, ammonium hydroxide is used in the hydrolysis step in place of sodium hydroxide.

F. The hydrolized polymer is prepared in the same way as procedure (A); however, lithium hydroxide is used in the hydrolysis step in place of sodium hydroxide.

The following examples relate to the treatment of sewage collected from sewers serving several metropolitan areas in the Eastern United States. The sewage is sampled as rapidly as possible to reduce changes brought about by biological action. The ability of the polymers of this invention to separate suspended solids from the sewage is compared with a flocculant consisting of the sodium salt of polyvinyltoluene sulfonic acid (PVTS). Both are in turn compared with the unaided settling action of raw sewage upon quiescent standing. The concentration of suspended matter in raw sewage is determined by the standard ASTM method wherein a standard amount of sewage is filtered through a Gooch crucible and the residue collected on the filter mat, weighed and compared with the original sample weight.

EXAMPLE 1

Three 2-liter aliquot samples of raw sewage were collected from the influent stream of the Southwestern Philadelphia, Pa. Waste Treatment Plant. A 1% aqueous solution of the hydrolyzed polymer of procedure A and a 1% aqueous solution of the sodium salt of polyvinyltoluene sulfonic acid (PVTS) were prepared. Dosages of 0.25 p.p.m. (parts flocculant per million of sewage) of the above polymeric material were added to two of the 2-liter raw sewage samples. The third 2-liter sewage sample was left unaltered. All of the sewage samples were flash mixed for three minutes at 100 r.p.m. and for ten minutes at 20 r.p.m. The treated and untreated sewage samples were allowed to stand quietly for three minutes. At the end of this period aliquots of the supernatant liquor were taken to measure the percentage of suspended solids removed respectively from the three sewage samples. The sample treated with the polymer had 82.4% of its suspended solids removed. The sample treated with PVTS had 68.5% of its suspended solids removed. The sample affected only by quiescent standing had 55.6% of its suspended solids removed.

EXAMPLE 2

A sampling technique similar to that of Example 1 was used for raw sewage collected at the Rye, New York Waste Treatment Plant. The samples were treated in the same fashion as in Example 1, except the dosages of the 1% polymeric solutions were changed to 0.875 p.p.m. instead of 0.25 p.p.m. The sample treated with the polymer of procedure A supra had a percent solids removal of 55.5%. The sample treated with PVTS had a percent solids removal of 42.2%. The unaltered quiescent standing sample had a percent solids removal of 36.0%.

EXAMPLE 3

Raw sewage samples taken from the Syracuse, New York Metropolitan Waste Treatment Plant, were collected and treated in the same manner as in Example 1, except the flocculant dosage was changed from 0.25 p.p.m. to 1.25 p.p.m. The sample treated with the polymer of procedure A supra had a percent solids removal of 74.7%. The sample treated with PVTS had a percent solids removal of 65.6%. The unaltered quiescent standing sample had a percent solids removal of 40.3%.

EXAMPLE 4

A second set of samples were collected from the Syracuse, New York Plant and treated in the same way as the samples in Example 3, except the flocculant dosage was changed from 1.25 p.p.m. to 3.0 p.p.m. The sample treated with the polymer of procedure A supra had a percent solids removal of 83.1%. The sample treated with PVTS had a percent solids removal of 68.7%. The unaltered quiescent standing sample had a percent solids removal of 39.0%.

EXAMPLE 5

Raw sewage samples taken from the East Hartford, Connecticut Waste Treatment Plant were collected and treated in the same manner as in Example 1, except the flocculant dosage was changed to 0.75 p.p.m. The sample treated with the polymer of procedure A supra had a percent solids removal of 31%. The sample treated with PVTS had a percent solids removal of 21%. The unaltered quiescent standing sample had a percent solids removal of 13%.

EXAMPLE 6

A second set of samples were collected from the East Hartford, Connecticut Plant and treated in the same way as the samples in Example 5. The sample treated with the polymer of procedure A supra had a percent solids removal of 57%. The sample treated with PVTS had a percent solids removal of 26%. The unaltered quiescent standing sample had a percent solids removal of 16%.

In each of the examples herein set forth, there is also a significant separation of insoluble biological oxygen demand material (BOD). For example, at the Southwest Philadelphia Waste Treatment Plant, the following results were obtained:

RUN 1

| Flocculant | Dosage (p.p.m.) | Percent BOD removal |
|---|---|---|
| Raw sewage (settled) | 0.25 | 53.0 |
| PVTS | 0.25 | 66.0 |
| NaA(81%)/VA(19%) (hydrolysate) | 0.25 | 83.5 |

RUN 2

| Flocculant | Dosage (p.p.m.) | Percent BOD removal |
|---|---|---|
| Raw sewage (settled) | 0.25 | 60.0 |
| PVTS | 0.25 | 70.0 |
| NaA(81%)/VA(19%) (hydrolysate) | 0.25 | 76.0 |

The BOD material contained in the raw sewage is oxidizable organic matter that serves as a source of food for bacteria in the raw sewage. The BOD material in breaking down depletes the oxygen dissolved in the rivers of the major cities and thereby increases the hazards for the aquatic life in those rivers. A significant problem of this type has been discovered in the 88-mile Delaware River estuary. It has been reported that a total of 1.1 million pounds of carbonaceous wastes are dumped into the estuary daily. This is enough to use up about 1.1 million pounds of oxygen. The percentage of BOD removal is a measure of the amount of dissolved oxygen that is required in the process of destroying or stabilizing this organic matter contained in the raw sewage. The calculation are based on the amount of oxygen required before and after treatment of the raw sewage.

What is claimed is:

1. A method for facilitating the separation of suspended solids from sewage which comprises incorporating in the sewage as the sole clarification agent a heterohydrolyzed water-soluble polymer comprising (a) acrylate and/or methacrylate salt units and (b) vinyl hydroxide units in an amount sufficient to increase the rate of sedimentation of said solids from the aqueous medium or to improve the filtration characteristics of said solids.

2. The method as described in claim 1 in which the molar ratio of salt units to vinyl hydroxide units in the polymer are in the range of 4 to 1 to 1 to 1.

3. The method of claim 1 in which the salts are alkali metal salts.

4. The method as described in claim 3 in which the salt units are heterohydrolyzed from $C_{1-4}$ alkyl esters of acrylic acid.

5. The method as described in claim 1 in which the polymer is a copolymer of sodium acrylate and vinyl alcohol.

6. The method as described in claim 5 in which the molar ratio of sodium acrylate to vinyl alcohol is in the range of 4 to 1 to 1 to 1.

References Cited

FOREIGN PATENTS 816,399  7/1959  Great Britain.
725,460  3/1955  Great Britain.

MICHAEL E. ROGERS, *Primary Examiner.*

U.S. Cl. X.R.

260—86.1